Feb. 5, 1946.    H. A. KNOX    2,393,993
FLEXIBLE IDLER
Filed Nov. 18, 1942    2 Sheets-Sheet 1
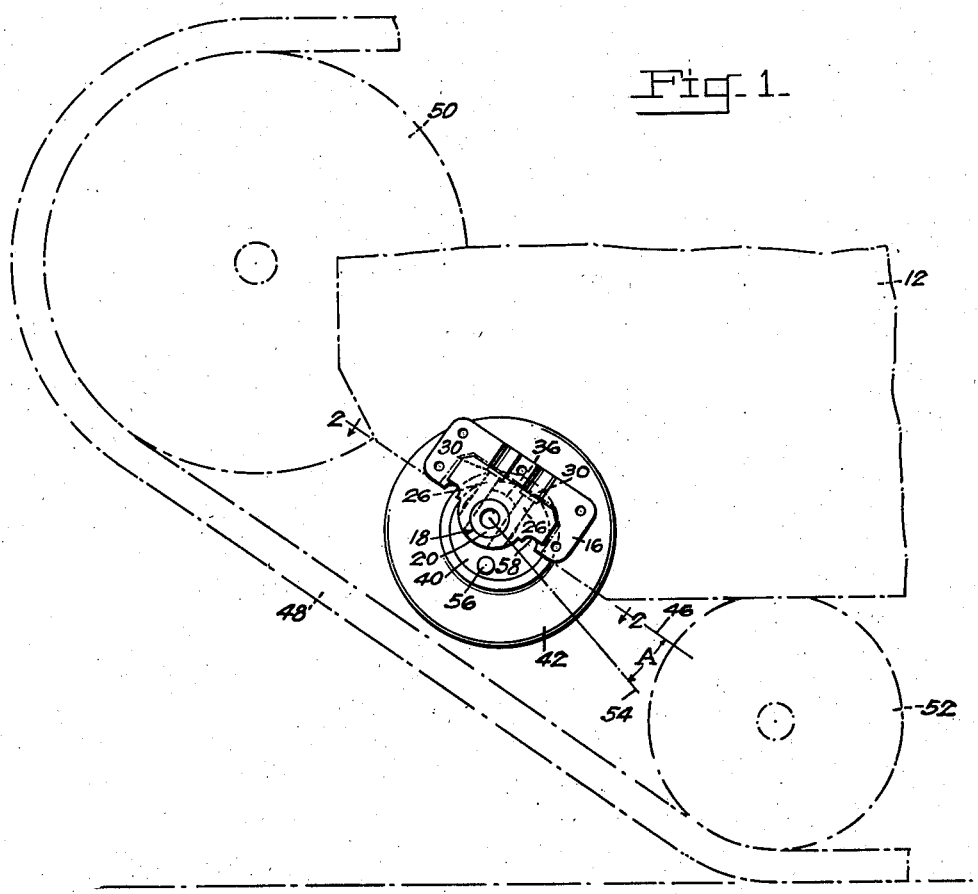
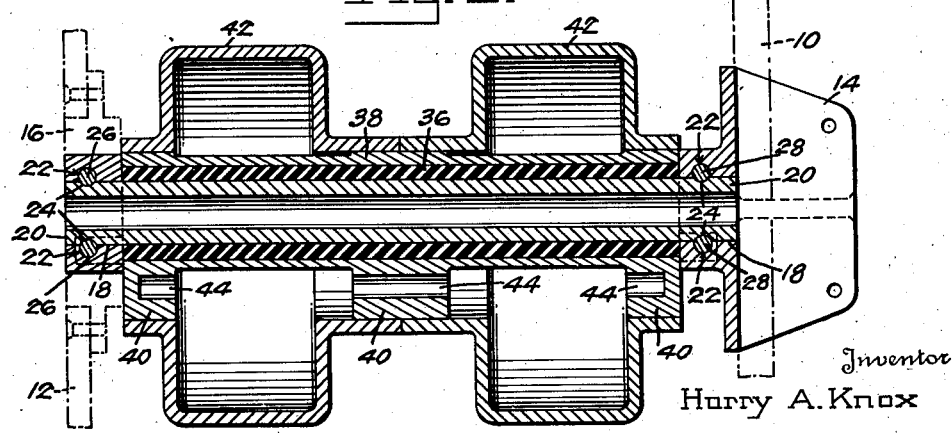
Inventor
Harry A. Knox Feb. 5, 1946.  H. A. KNOX  2,393,993
FLEXIBLE IDLER
Filed Nov. 18, 1942  2 Sheets-Sheet 2
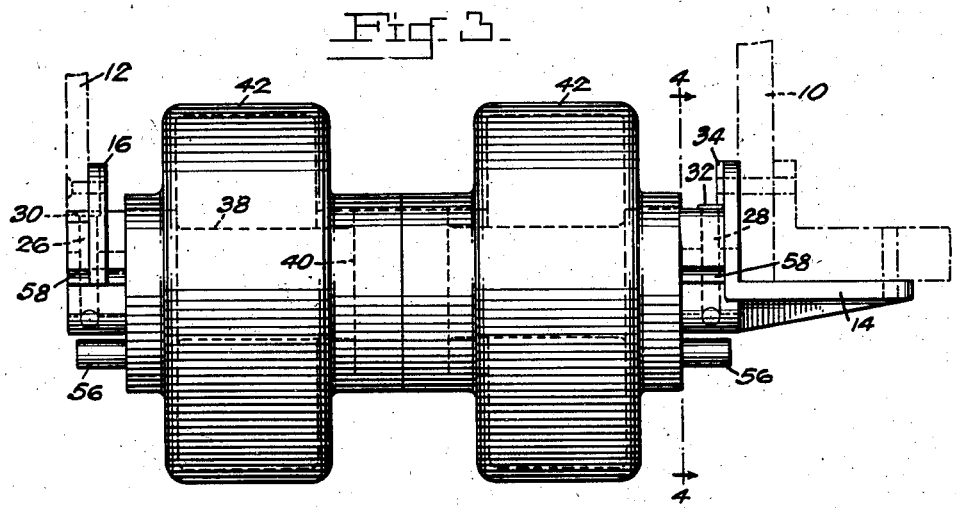
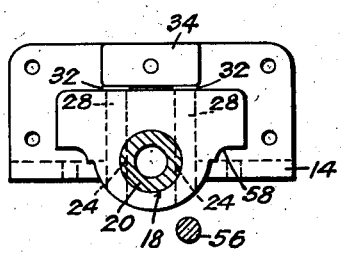
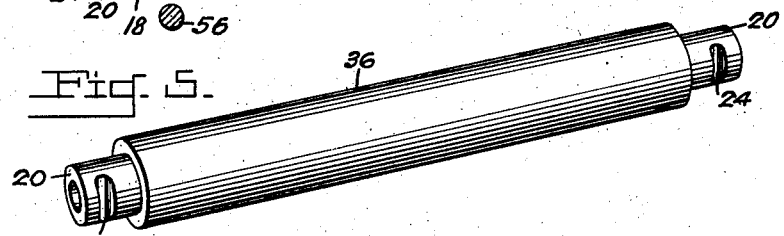
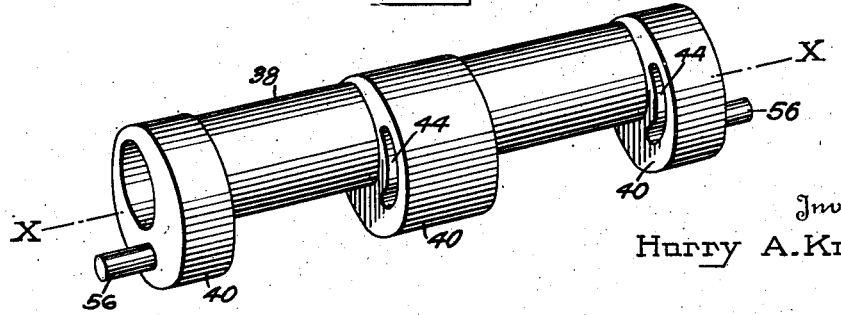
Inventor
Harry A. Knox Patented Feb. 5, 1946

2,393,993

UNITED STATES PATENT OFFICE 2,393,993

FLEXIBLE IDLER

Harry A. Knox, Washington, D. C.

Application November 18, 1942, Serial No. 465,971

3 Claims. (Cl. 74—242.16)

The invention described herein may be manufactured and used by or for the Government for governmental purposes, without the payment to me of any royalty thereon.

This invention relates to track laying vehicles, particularly to an auxiliary idler wheel for the track.

The track of track laying vehicles, especially combat vehicles, is given a forward slope at the front end of the vehicle to improve the climbing ability of the vehicle. The track is conventionally supported at each end of the slope by wheels, one of which may be an idler wheel and the other may be the drive wheel; alternatively, both wheel may be idlers. In large vehicles, this arrangement leaves a substantial portion of the track unsupported, and makes it desirable to provide an auxiliary idler which is normally out of contact with the track but which is yieldably engaged by the track when the track encounters an obstacle in climbing which suffices to displace the track against the idler.

It is an object of this invention to provide a track idler which permits a limited amount of displacement of the track when the track is forced against the idler wheel by encountering an obstacle which forces the track out of its normal alignment. The idler wheel is preferably provided for an otherwise unsupported portion of the track. The object is accomplished by an idler wheel mounted eccentric to the axis of a support pin which has a yielding, elastic connection to the wheel bearing. The connection is such that the resistance to displacement of the wheel is substantially constant for a predetermined displacement, after which the resistance increases rapidly.

The specific nature of the invention as well as other objects and advantages thereof will clearly appear from a description of a preferred embodiment as shown in the accompanying drawings in which:

Fig. 1 of the drawings is a side elevation view of a portion of a tank having a track idler embodying the invention.

Fig. 2 is a view in section on line 2—2 of Fig. 1.

Fig. 3 is a view in elevation, taken at right angles to the view of Fig. 2.

Fig. 4 is a view in section on line 4—4 of Fig. 3.

Fig. 5 is a view in perspective of the pin and the elastic bushing.

Fig. 6 is a view in perspective of the sleeve and the wheel when contacted by the said tank supporting bearings.

Fig. 7 is a diagram of the forces involved in displacement of the idler wheel, and the effective moment arm of the displacing force. For the sake of simplicity, the entire diagram is turned counterclockwise from the position it takes in Fig. 1.

Referring to the drawings in detail, the vehicle body is indicated in dotted lines at 10 of Fig. 2. An outer or side plate is shown at 12. A bracket or hanger 14 is secured to body plate 10 by any suitable means, not shown; a similar hanger 16 is secured to side plate 12. Hangers 14 and 16 have openings 18 to receive the ends of a support pin 20. Additional holes 22 are provided in the hangers 14 and 16 transverse to pin 20. Grooves 24 in the pin ends cooperate with holes 22 as shown in Fig. 2 to form passages to receive keys 26 and 28 having heads 30 and 32 to locate the keys. The keys serve to hold pin 20 in nonrotative relation to the hangers and the vehicle body. Keys 28 are held in place by a holder 34 secured to the bracket above the keys and in contact with heads 32. Keys 26 may be held in place by a similar expedient, not shown, or merely by side plate 12, which may be cut out to receive hanger 16, in which case the upper edge of the cut-away portion would engage the upper sides of heads 30, as shown in Fig. 1 in dotted lines. Actually, as can be seen in Fig. 2, the side plate would engage only the outer half of each head, but this is entirely adequate to hold the keys in place.

A bushing 36 of a resilient, yieldable, elastic substance is provided on pin 20. The inner surface is preferably permanently secured to the pin; where the bushing is of rubber, it may be vulcanized to the pin. A sleeve 38 is pushed over the bushing, which is preferably larger than the inside of the sleeve. The fit of the sleeve on the bushing should be tight enough to prevent relative rotation of the outer surface of the bushing and the inside of the sleeve, so that all rotation of the sleeve relatively to the pin will be accomplished by flexing of the bushing.

Sleeve 38 carries one or more bearings 40 on which rotate idler wheels 42. Bearings 40 may be hollowed out as at 44, for the purpose of conserving material or to make the parts lighter. It will be understood that bearings 40 do not rotate on the sleeve. To that end, the sleeve and the bearings may be made integral by forming all in one piece or by any other suitable means. As can be seen from the drawings, especially Fig. 6, the bearings 40 are eccentric to sleeve 38, and therefore to pin 20. It naturally follows that idler whels 42 rotate about an axis which is eccentric to the axis of pin 20. The eccentricity serves as a lever arm by which the load on the wheels flexes the elastic bushing.

In the assembly, the parts are so arranged that the wheel and bearing axis X falls between the nearest portion of the track and a line parallel to that portion of the track and passing through the pin axis Y. This line is shown at 46 in Figs. 1 and 7. The portion of the track which will normally be the nearest portion is naturally that part of the track which is adapted or likely to ride on the wheels if sufficiently displaced, as the portion 48 disposed between drive wheel 50 and idler wheel 52, shown in Fig. 1. Preferably, the disposition of parts is such that a line 54 through the axis X of wheels 42 and axis Y of pin 20 makes an angle A of approximately 15° with line 46. With such an arrangement, the maximum moment arm of the load on wheels 42, tending to flex bushing 36, is not reached until line 54 has been turned through the angle A. Therefore, during the first part of the displacement of wheels 42, the moment arm L of the force on the wheels increases. Meanwhile, of course, the force necessary to flex the elastic bushing is increasing because of the increase in displacement, the same as the force necessary to compress a spring increases as the spring is compressed. However, this increase in force is partially offset by the increasing moment arm. Therefore, for a short displacement of the portion 48 of the track and wheels 42, the force F displacing the track tends to remain constant. Of course, as soon as line 54 has passed line 46, the force necessary to displace the track increases greatly, first because of the "spring" rate of the bushing, and second because of the decreasing moment arm. In this manner, a substantially constant resistance is offered to a small displacement of the track, after which the resistance increases rapidly. To prevent damage to the rubber bushing or slipping of sleeve 38 on the bushing, the rotation or pivoting of the axis of bearings 40 and wheels 42 about the pin axis is limited by a positive stop consisting of a peg 56 on each end bearing 40 and a stop 58 on the hangers.

*Operation.*—If an obstruction is encountered by the portion 48 of the track, the track is deflected against wheels 42, which rotate as they support the track. The support is resilient, permitting elastic displacement of the wheel inward. For a small displacement inward of the wheel, there is no appreciable increase in resistance, but thereafter, resistance to inward displacement increases rapidly, as outlined above.

I claim:

1. In a track laying vehicle, an idler wheel normally out of contact with the track and adapted to turn when in contact with the track, an elastic mounting for the wheel to permit a yielding displacement of the wheel when contacted by the said track, and a stop to limit the amount of yielding movement.

2. In combination, a pair of stationary hangers, a support pin carried by the hangers in non-rotative relation thereto, a yieldable elastic bushing having its inner surface non-rotatively secured to the pin, a sleeve surrounding the pin and tightly compressing the bushing, a wheel rotatable on the sleeve about an axis which is eccentric to the axis of the pin, and a stop cooperable with the sleeve to limit the amount of yield of the elastic bushing.

3. In a track-laying vehicle, in combination, a fixed support pin carried by the vehicle, a bearing mounted on said pin in eccentric relation thereto, a yieldable elastic bushing fitted between said pin and said bearing and having its inner and outer surfaces non-rotatably secured respectively to said pin and said bearing, an idler wheel rotatably mounted on said eccentric bearing whereon it is adapted to be yieldingly displaced when engaged by said track, a movable abutment fixed relative to said bearing and movable therewith, and another abutment disposed in the path of said movable abutment and fixed relative to said pin for limiting rotary bodily movement of said bearing to a value within the elastic limit of said bushing.

HARRY A. KNOX.